United States Patent
Hoyle et al.

(10) Patent No.: US 6,474,439 B1
(45) Date of Patent: Nov. 5, 2002

(54) DIPOLE LOGGING TOOL

(75) Inventors: David Hoyle, Yokohama (JP); Hitoshi Tashiro, Kamakura (JP); Benoit Froelich, Tokyo (JP); Alain Brie, Tokyo (JP); Hiroshi Hori, Sagamihara (JP); Hitoshi Sugiyama, Sagamihara (JP); Jahir Pabon, Brookfield, CT (US); Frank Morris, Missouri City, TX (US)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/537,836

(22) Filed: Mar. 29, 2000

(51) Int. Cl.$^7$ .................................................. G01V 1/40
(52) U.S. Cl. ........................ 181/102; 181/104; 181/111; 181/121; 367/25; 367/117; 367/153; 367/176; 367/189
(58) Field of Search ................................. 181/102, 104, 181/105, 106, 110, 111, 121, 139; 367/25, 35, 117, 153, 154, 166, 171, 172, 176, 189

(56) References Cited

U.S. PATENT DOCUMENTS

| | | |
|---|---|---|
| 3,583,677 A | 6/1971 | Phillips |
| 4,207,961 A | 6/1980 | Kitsunezaki |
| 4,383,591 A | 5/1983 | Ogura |
| 4,649,525 A | 3/1987 | Anagona et al. |
| 4,674,591 A * | 6/1987 | Vogen ........................ 181/108 |
| 4,709,362 A | 11/1987 | Cole |
| 4,862,990 A * | 9/1989 | Cole ........................ 181/106 |
| 4,862,991 A | 9/1989 | Hoyle et al. |
| 4,874,061 A * | 10/1989 | Cole ........................ 181/106 |
| 4,951,267 A * | 8/1990 | Chang et al. .................. 367/31 |
| 5,036,945 A * | 8/1991 | Hoyle et al. ................. 181/104 |
| 5,043,952 A | 8/1991 | Hoyle et al. |
| 5,080,189 A | 1/1992 | Cole |
| 5,135,072 A | 8/1992 | Meynier |
| 5,166,909 A | 11/1992 | Cole et al. |
| 5,266,845 A | 11/1993 | Sakaue |
| 5,266,854 A * | 11/1993 | Murray ........................ 310/36 |
| 5,357,481 A | 10/1994 | Lester et al. |
| 5,477,101 A | 12/1995 | Ounajela |
| 5,491,306 A * | 2/1996 | Gram ........................ 181/106 |
| 5,852,262 A | 12/1998 | Gill et al. |
| 6,102,152 A * | 8/2000 | Masino et al. ............... 181/106 |

FOREIGN PATENT DOCUMENTS

WO    WO 00/17672    3/2000

OTHER PUBLICATIONS

B.K. Sinha and S. Zeroug, "Geophysical Prospecting using Sonics and Ultrasonics," *Wiley Encyclopedia of Electrical and Electronic Eng'g*, pp. 340–365 (1999).

S.M. Cohick and J.L. Butler, Rare–Earth Iron "Square Ring" Dipole Transducer, *J. Acoustical Soc'y of Am.* 72 (2), pp. 313–315 (Aug. 1982).

* cited by examiner

*Primary Examiner*—Robert E. Nappi
*Assistant Examiner*—Edgardo San Martin
(74) *Attorney, Agent, or Firm*—Robin Nava; Brigitte L. Jeffery; John J. Ryberg

(57) ABSTRACT

A logging tool having a tool body, which can be positioned in a fluid-filled borehole, including a receiver section and a dipole transmitter; wherein the dipole transmitter includes a transducer with a shell having a reaction mass and a motor located therein, the motor operatively connecting the shell and the reaction mass such that only an outer surface of the shell is in contact with the fluid in the borehole. This new type of dipole source for well logging involves shaking all or part (axially) of a dipole tool body to produce a pure, broadband acoustic dipole signal while at the same time coupling as little energy as possible into the tool body. Important variations on this idea include a linear phased array of shaker sources, and active cancellation of tool borne noise.

19 Claims, 5 Drawing Sheets

FIG. 5
FIG. 6
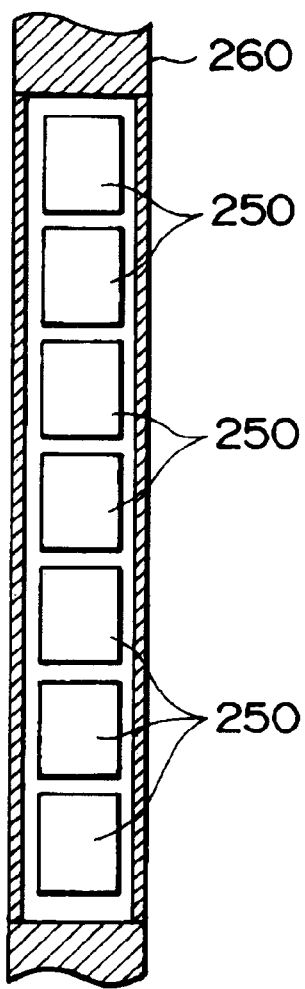
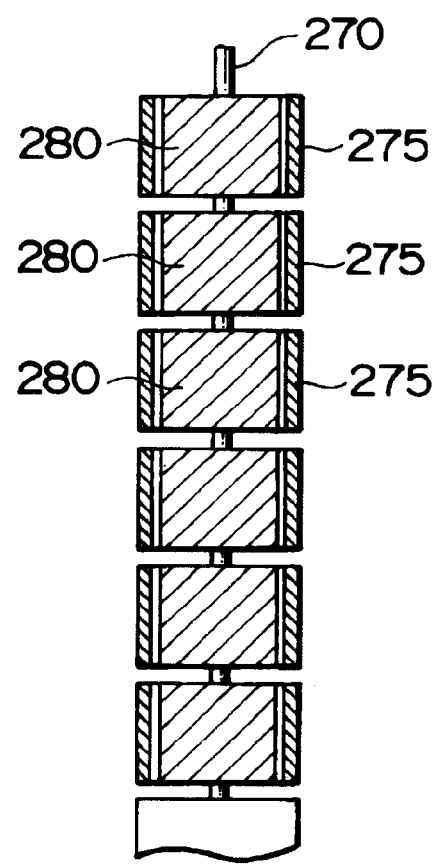

DIPOLE LOGGING TOOL

FIELD OF THE INVENTION

The present invention relates to acoustic borehole logging tools having dipole transmitters. In particular, the invention relates to the use of a novel dipole transmitter for use in a borehole logging tool which addresses certain shortcomings of prior art designs.

BACKGROUND OF THE INVENTION

The field of sonic logging of boreholes in the oil and gas industry involves making acoustic measurements in the borehole at frequencies typically in the range 500 Hz–20 kHz. Below this range is typically considered as the seismic domain, above it the ultrasonic domain. In some cases, but not all, techniques and technologies are transferable between these domains. A summary of the general techniques involved in borehole acoustic logging can be found in GEOHYSICAL PROSPECTING USING SONICS AND ULTRASONICS, Wiley Encyclopaedia of Electrical and Electronic Engineering 1999, pp 340–365.

One example of a sonic logging tool is Schlumberger's Dipole Sonic Imaging tool (DSI) which is shown in schematic form in FIG. 1. The DSI tool comprises a transmitter section 10 having a pair of (upper and lower) dipole sources 12 arranged orthogonally in the radial plane and a monopole source 14. A sonic isolation joint 16 connects the transmitter section 10 to a receiver section 18 which contains an array of eight spaced receiver stations, each containing two hydrophone pairs, one oriented in line with one of the dipole sources, the other with the orthogonal source. An electronics cartridge 20 is connected at the top of the receiver section 18 and allows communication between the tool and a control unit 22 located at the surface via an electric cable 24. With such a tool it is possible to make both monopole and dipole measurements. The DSI tool has several data acquisition operating modes, any of which may be combined to acquire (digitised) waveforms. The modes are: upper and lower dipole modes (UDP, LDP)—waveforms recorded from receiver pairs aligned with the respective dipole source used to generate the signal; crossed dipole mode—waveforms recorded from each receiver pair for firings of the in-line and crossed dipole source; Stoneley mode—monopole waveforms from low frequency firing of the monopole source; P and S mode (P&S)—monopole waveforms from high frequency firing of the monpole transmitter; and first motion mode—monopole threshold crossing data from high frequency firing of the monopole source.

Various types of dipole signal source have been proposed and used in the past. These include:

i) Electro-magnetic transducer devices such as is used in Schlumberger's DSI tool. (see for example Hoyle et al; U.S. Pat. No. 4,862,991 and Kitsunezaki in U.S. Pat. No. 4,207,961 or Ogura in U.S. Pat. No. 4,383,591).

ii) Linked mass vibrators driven by magnetostricitve actuators. (see for example Cohick and Butler, "Rare-earth Iron Square Ring Dipole Transducer", J. Acoustical Society of America, 72(2), August, 1982)

iii) Piezo-electric bender devices such as are used in the XMAC tool of Baker Atlas. (see for example Angona et al, U.S. Pat. No. 4,649,525)

iv) Magnetic repulsion transducers driving a plate in contact with a fluid in an acoustic wave guide system such as are used in the MPI XACT tool. (see for example Gill et al, U.S. Pat. No. 5,852,262)

v) Eccentric orbital masses as proposed by Cole in U.S. Pat. No. 4,709,362, Meynier in U.S. Pat. No. 5,135,072 and others, mainly for seismic uses.

Dipole sonic sources of types i) to iv) described above typically comprise a heavy, stiff tool body having the actuator (piston or plate) mounted therein via a transducer or drive mechanism, the actuator contacting the borehole fluid through ports in the tool body. In use, the tool body acts a reaction mass against which the transducer acts to oscillate the actuator. However, the effect of this is to excite tool body recoil vibrations, which interfere with the dipole flexural signal in the borehole. In these sources the tool body is used as the reaction mass. Its large vibrating surface is a very efficient radiator of noise into the borehole flexural mode. This means also that increasing the excitation force increases recoil vibrations in the same proportion as the signal. Another problem is that the dipole signals couple into the tool structure and travel along it directly to the receivers where they interfere with the detection of the signals of interest from the formation. Various measures have been used or proposed to deal with this problem, for example: locating the source and receivers in separate sondes connected by a flexible cable; the use of isolation joints which include structures for attenuating or delaying signals travelling along the tool; or adopting a structure which does not include any continuous mechanical structure along the length of the tool so as not to provide a signal path; or the use of housings around the receivers which delay the arrival of tool signals. Transmitters of these types are imperfect dipoles, because of the limited azimuthal extent of the active radiating surface (i.e. the ports in the tool body). Strong hexapole aliasing can be produced by such sources, and possibly strong monopole contamination when the source is eccentered in the borehole. Furthermore, bender (piezoceramic bimorph) sources (type iii) are inherently band limited in frequency, and radiate over a small azimuthal extent.

Orbital vibrators and counter-rotating eccentric mass devices (type v) are typically appropriate only for lower frequencies, typically below 500 Hz., and are often found in seismic applications. Such sources are not normally considered as suitable for broad band or higher frequency use such as is encountered in sonic logging.

If the full flexural dispersion curve (phase slowness vs. frequency) is to be used to make measurements at different depths of investigation for a wide variety of petrophysical, geophysical, and geomechanical applications, wideband dipole sources of high purity will be required. Moreover, in dipole tools, where the flexural impedance of even the most "rigid" tool body is low, recoil vibrations of the tool body, wave propagation along the tool body, and reflections at tool joints and within acoustic isolation sections, have all been found to radiate noise into the borehole and formation, contaminating the flexural signal. Consequently, the transmitter and tool body should be designed as a system to minimize these noise sources.

SUMMARY OF THE INVENTION

The present invention provides a logging tool comprising a tool body, which can be positioned in a fluid-filled borehole, having a receiver section and a dipole transmitter; wherein the dipole transmitter includes a transducer comprising a shell having a reaction mass and a motor located therein, the motor operatively connecting the shell and the reaction mass such that only an outer surface of the shell is in contact with the fluid in the borehole.

The present invention concerns a new type of dipole source for well logging. Specifically, the new source involves the idea of shaking all or part (axially) of a dipole tool body to produce a pure, broadband acoustic dipole signal while at the same time coupling as little energy as possible into the tool body. Important variations on this idea include a linear phased array of shaker sources, and active cancellation of tool borne noise.

The dipole transducer is preferably mounted in the tool body by means of spring mountings, the resonant frequency of which is such that coupling of flexural vibrations from the receiver to the tool body in a predetermined frequency range is inhibited. Typically, the resonant frequency of the spring mountings is less than the lower limit of the predetermined frequency range. It is also preferred that the spring mountings are relatively flexible in the direction of oscillation of the dipole transmitter and relatively stiff in a direction orthogonal thereto.

The resonant frequency of the shell also preferably falls outside a predetermined frequency range, and the weight of the shell is less than the weight of the reaction mass.

The dipole transducer can be located in a cavity in the tool body, structural members extending between parts of the tool body on either side of the cavity around the periphery of the cavity. The resonant frequency of the structural members preferably falls outside the frequency range of interest.

Alternatively, where there is a structural load bearing member running along the length of the tool inside the tool body, the dipole transducer can be mounted on the load bearing member.

Preferably, the shell is shorter than the shortest wavelength of acoustic waves in the formation surrounding the borehole to be measured. In any event, it is desirable to have the shell as short as possible so as to resemble closely a point source.

In an embodiment of the invention, a stiff (in the frequency range of interest) shell directly coupled to the borehole fluid is excited in the radial sense relative to a heavy internal reaction mass by an appropriate linear motor. This source produces a purer dipole signal than sources consisting of active elements (pistons, benders, hydraulic outlets) of small azimuthal extent located on heavy tool bodies, less hexapole being produced due to the full azimuthal extent of the radiating surface. In this embodiment, recoil vibrations of the reaction mass are prevented from coupling to the borehole liquid, where they would otherwise produce interfering noise in the borehole flexural signal.

The transmitter should produce little or no monopole component, whereas prior art transmitters produce both monopole and dipole. The external shell is typically cylindrical, but other shapes (spherical, ovoid, etc.) are possible. The shell can be either stiff in bending (having no bending modes in the frequency range of interest), or alternatively, the first bending mode of the shell can be excited deliberately to amplify the output. This embodiment will produce a more narrow band output than the rigid shell configurations. Given the extreme pressures encountered in the borehole environment, the shell must be either pressure balanced, or strong enough to resist absolute pressure. In the case of a liquid filled, pressure balanced shell, sufficient radial clearance must be maintained between the inside of the shell and the outside of the reaction mass to minimize the resistive loading due to viscous losses in the liquid (oil). An air filled shell must be thick and strong enough to withstand absolute pressure (typically 15–20 kpsi), however clearances between the shell and the reaction mass can be made smaller than in the oil-filled case. Since keeping resonant modes of the shell out of the frequency range of interest typically requires a fairly thick shell, a relatively thick, air filled shell is one preferred embodiment for the source.

With an air-filled shell the external support/suspension which connects the transducer to the tool body will typically be in direct contact with the radiating shell. The oscillations of the shell will directly excite acoustic vibrations in the support. In an oil-filled embodiment, the support/suspension can be made to contact only the internal reaction mass. Because the oscillations of the heavy reaction mass are typically of much smaller amplitude that those of the lighter shell, vibrations transmitted to the support will be of correspondingly smaller amplitude than in the air filled case. In another preferred embodiment, the source is configured to produce output in both the X and Y (orthogonal) directions at one axial level. In another embodiment, X and Y sources are located at different, but closely spaced axial levels. Transmitters can be mounted in slotted housings and in the form of arrays of multiple transmitters operated as a phased-array if required.

In a phased-array configuration, a length of source housing can be excited by multiple motors so as to match the excitation in amplitude and phase of a given section of the borehole (i.e. a single shell). Alternatively, an axial array of rigid shells can be excited with appropriate amplitude and phase to match the excitation function of a given borehole. These embodiments with more than one independent motor are considered to be phased array dipole sources.

In the case where the shell comprises part of a tool housing also containing receiving elements at another axial location, appropriate control of the excitation of the driven section can be performed to prevent flexural vibrations from propagating into the receiver section. This case combines both source and active tool noise reduction functions.

A typical frequency range for present dipole sonic logging in the borehole is 0.5–5 kHz. For next generation tools it is of interest to extend this range to lower frequencies if the source is pure enough not to excite Stoneley waves. It is also of interest to extend this range upward to 10 kHz. Orbital vibrators are appropriate only for lower frequencies, typically below 500 Hz.

For the above stated frequencies the linear motor (actuator) technologies listed hereafter are considered appropriate:

Electrodynamic (moving coil—loudspeaker type)
Electromagnetic (magnetic attraction—BBN type)
Magnetic repulsion (Lorentz force or eddy current)
Piezoelectric stack
Magnetostrictive bar
Hydraulic (high frequency servovalve)
Hybrid (piezo-hydraulic, piezo with mechanical amplification, etc. Rotating eccentric mass systems currently available are generally not considered appropriate above 500 Hz but may be applicable for frequencies at or below this limit.

BRIEF DESCRIPTION OF THE DRAWINGS

FIG. 5 shows a further embodiment of the transmitter section; and

FIG. 6 shows yet another embodiment of the transmitter section.

DESCRIPTION OF THE PREFERRED EMBODIMENT

Figure 1:
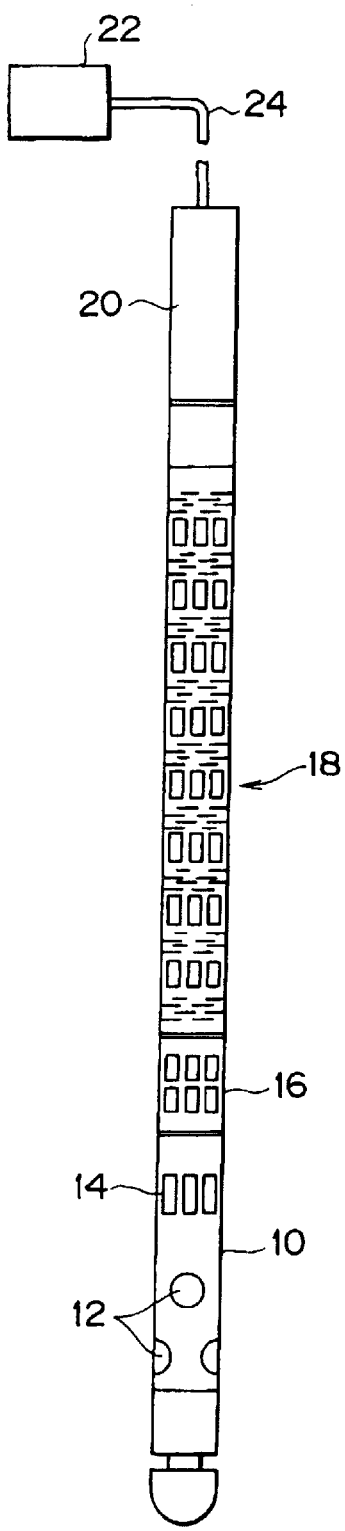
FIG. 1 shows a schematic view of a prior art tool.
Figure 2:
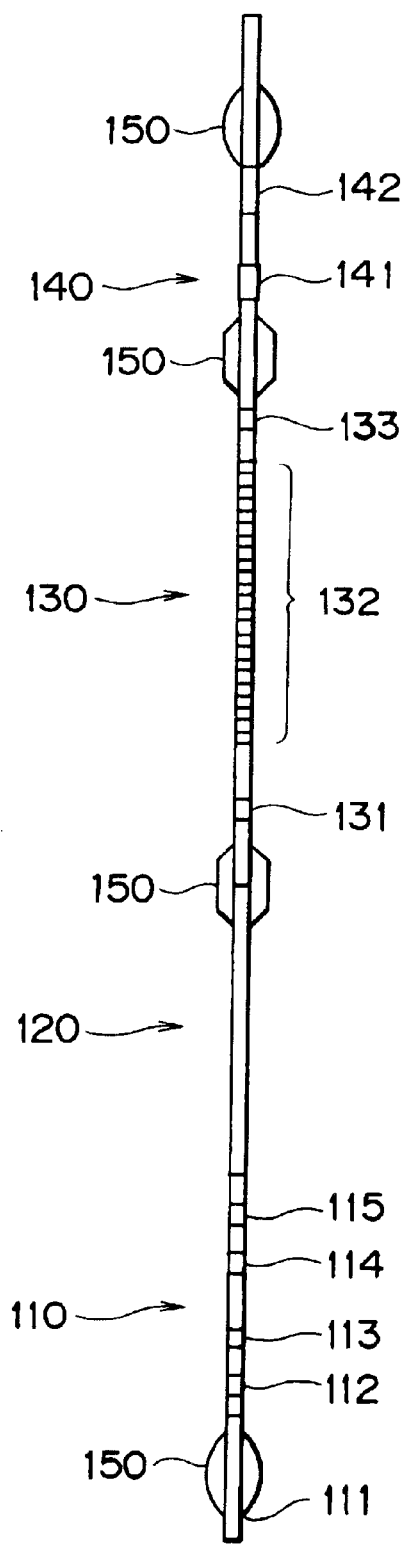
FIG. 2 shows a schematic view of a tool according to one embodiment of the invention.

FIG. 2 shows a logging tool according to one embodiment of the invention which incorporates the novel dipole transmitter. The tool shown includes a transmitter section 110 having power electronics 111, a pressure compensator 112, a far monopole transmitter 113, a first dipole transmitter 114 oriented in the X azimuthal direction, and a second dipole transmitter 115 oriented in the Y azimuthal direction. The monopole transmitter 113 is substantially as described in U.S. Pat. No. 5,043,952 (incorporated herein by reference). The two dipole transmitters 114, 115 comprise particular implementations of the electromagnetic transducer described in U.S. Pat. No. 5,266,845 (incorporated herein by reference) which will be described in more detail in relation to FIG. 4 below. The spacer section is designed to provide suitable separation of the transmitter section 110 and the receiver section 130 while avoiding interference of the signals detected in the receiver section 130 by acoustic signals propagating along the tool. The structure of the spacer section 120 in this case comprises a central, load bearing mandrel carrying a series of mass structures securely fixed thereto (not shown). Other forms of spacer or acoustic isolator may also be appropriate in the present invention. The receiver section 130 comprises a first near monopole transmitter 131 which is substantially the same as the far monopole transmitter 113, an array 132 of twelve receiver stations (other numbers of stations are also possible, for example eight or sixteen), each station comprising eight hydrophone detectors (four may also be used) arranged equally around the circumference of the tool and aligned from station to station, and a second near monpole transmitter 133 on the opposite side of the array 132 to the first near transmitter 131. The cartridge and compensator section 140 includes a pressure compensator section 141 which acts on the receiver section 130, and electronics circuits for near monopole transmitter inside the shell. In fact, providing shortest length possible means that the source behaves more like a point source which is highly desirable.

Figure 3:
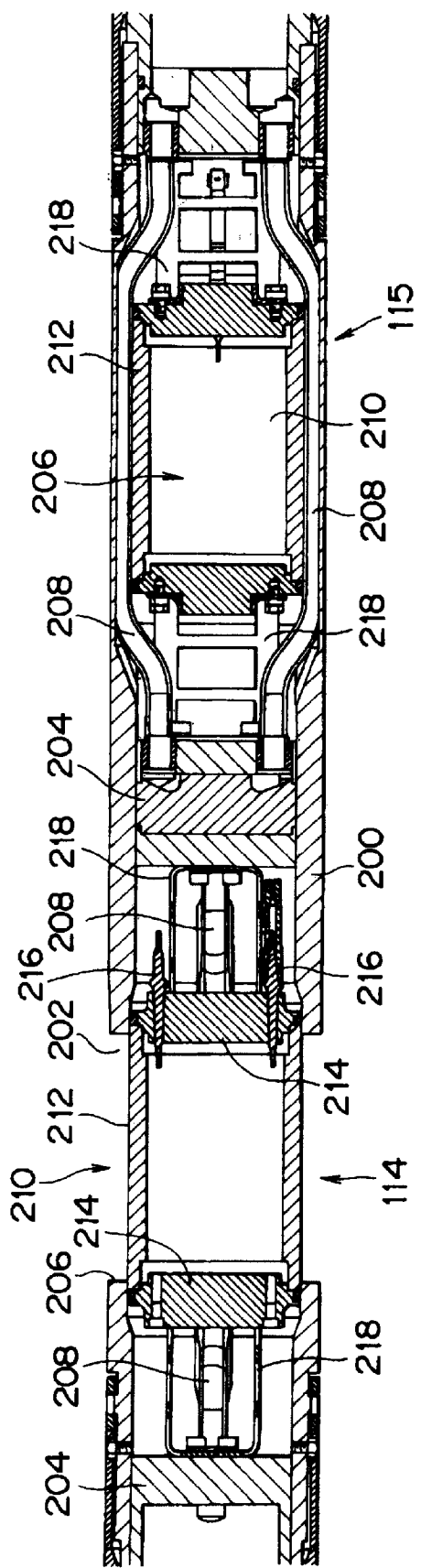
FIG. 3 shows a detailed view of the transmitter section of FIG. 2.

FIG. 3 shows the construction of the transmitter section 110 carrying the two dipole transmitters in more detail. The X and Y dipole transmitters 114, 115 are identical in construction but rotated relative to each other by 90° around their common axis. The same numerals will be used to indicate common parts to the two transmitters. A tubular housing 200 provides a load-bearing structure for locating the transmitters. Transmitter-location cavities 202 are defined between rigid mass fixing blocks 204 located within the housing with a pair of opposed windows 206 provided in the housing at each cavity. The windows face the X or Y direction according to which transmitter is to be located in that cavity, i.e. the openings of one location are set at 90° to those of the other (Both windows can be seen for the X transmitter, the Y transmitter is effectively viewed through one window in this Figure). Wiring channels 208 (shown in part) are provided in the outer surface of the housing 200 around the cavities 202 so as to provide a conduit for wiring to pass from the inside of the housing on one side of a cavity, around the transmitter cavity, and back into the housing on the other side.

A dipole transducer 210 is located in each cavity 202. The transducers 210 comprise a shell 212, end caps 214 with wiring feed-throughs 216, and a motor (not shown) located inside the shell 212. The transducers will be described in more detail in relation to FIG. 4 below. Each transducer 210 is secured at either end to the mass fixing blocks 204 by means of U-shaped leaf springs 218 which are firmly fixed to the mass fixing blocks 204 and the end caps 214 respectively. The leaf springs 218 are relatively stiff in the plane of the spring but relatively flexible in directions perpendicular to this. Thus by aligning the leaf springs correctly, the transducer is allowed to vibrate relatively freely in one direction (X or Y depending on which transmitter is being considered) while held securely in the orthogonal direction. The resonant frequency of the leaf springs is chosen to be outside the frequency range of interest for the transmitters. In the present case, it is desired to produce a relatively broad band source in the range 0.5–10 kHz. Consequently, the resonant frequency of the springs is chosen to be less than 0.5 kHz in the desired direction. This also ensures that relatively little energy is coupled into the housing (which has a relatively high resonant frequency). The spring structure shown here has the advantage that it avoids torsional distortion and so maintains the alignment of the source. It is also desirable that the resonant frequency of the housing fall outside this range for the same reason.

Figure 4:
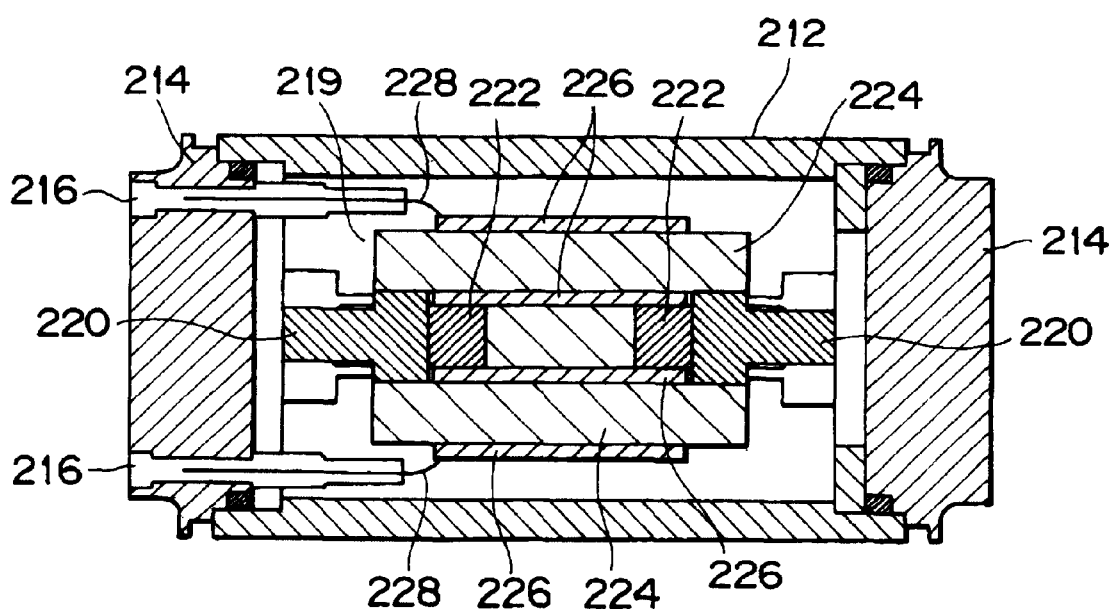
FIG. 4 shows a detailed view of the transducer of FIG. 3.

FIG. 4 shows a transducer in more detail. The shell 212 and end caps 214 are made of steel and securely fastened together to define a sealed, pressure resistant chamber. In the present case, this chamber is air-filled but it is possible that some other fluid such as an oil could be used to avoid problems in making the chamber resistant to such high pressure differences. A linear motor 219 is located within the chamber. The motor is of the type described in U.S. Pat. No. 5,266,854, and comprises fixed pole pieces 220 which are firmly connected to the end caps 214 (and hence the shell 212) and which carry magnets 222, and floating pole pieces 224 located on either side of the fixed pole pieces 220 and weakly connected thereto by very soft springs. Coils 226 are provided around the pole pieces 220, 224 and connected to an electrical signal source (not shown) by wires 228 which pass through the feed-throughs 216. In use, application of a signal to the coils causes the pole pieces 220, 224 to oscillate in a linear manner relative to each other. The floating pole pieces 224 act as a reaction mass against which the fixed pole pieces 220 act to cause the shell 212 to oscillate in a given direction. To optimize this behavior, the mass of the floating pole pieces, end caps and shell is preferably made less than that of the floating pole pieces. Since the outer surface of the shell 212 is in contact with fluid in the borehole in use, it acts to radiate a dipole signal into the fluid and borehole. The floating pole pieces 224 (reaction mass) do not contact the borehole fluid in any way so do not radiate any opposing signal. Also, the soft mounting of the transducer by the leaf springs 218 means that relatively little energy is coupled to the housing where it might propagate along the tool structure directly to the receivers, or be radiated from the tool body into the borehole fluid to interfere with the desired signals. By selecting the materials and dimensions of the components of the transducer, its inherent resonant frequency can be controlled. Where the transducer is required to drive a broadband source, it is desirable that the resonant frequency of the transducer falls outside the frequency band of interest. However, if the source is intended for narrow band use, the resonant frequency can be tuned to lie at the frequency of interest so as to optimize the signal output by the transducer. It is also desirable that the length of the shell 212 be shorter than the shortest wavelength of signal propagating in the formation, while still allowing the mass and motor mechanism to be housed inside the shell. In fact, providing shortest length possible means that the source behaves more like a point source which is highly desirable.

The embodiment described above, represents one preferred manner of implementing the invention. It will be appreciated that various changes can be made while staying within the scope of the invention. In particular, the selection of motor to be used will depend on requirements of space, power availability, etc. Other potentially suitable technologies have been outlined above.

The embodiment shown in FIG. 2 has two dipole sources. Clearly, if only one is required, only one can be provided. Also, it is possible to include two linear motors in a single shell operating at right angles, either with a reaction mass for each motor, or a single mass for both motors. In this case, the spring mounting described above will not be appropriate and more freedom will be required.

The invention is not limited to one or two sources. It is possible to provide an array of several sources 250 in a single tool housing 260 (see FIG. 5). Each source can be aligned in a different direction or all aligned in a single direction. Where they are aligned, the sources can be driven in a phased manner to enhance directionality of the signal.

An alternative structure for the tool is to have a central, load-bearing mandrel 270 running along the length of the tool onto which the various functional elements of the tool are mounted. An example of this is shown in FIG. 6. In this case, the reaction mass 275 is fixed to the mandrel 270 and the shell 280 moves relative to this. By configuring the arrangement of the mandrel and masses, the acoustic behavior of the whole structure can be controlled to avoid interference by signal propagating along the tool structure.

What is claimed is:

1. A logging tool comprising a tool body, which can be positioned in a fluid-filled borehole, having a receiver section and a dipole transmitter; wherein the dipole transmitter includes a transducer comprising a shell having a reaction mass and a motor located therein, the motor operatively connecting the shell and the reaction mass, and only an outer surface of the shell being in contact with the fluid in the borehole.

2. A logging tool as claimed in claim 1, wherein the transducer is mounted in the tool body by means of spring mountings, the resonant frequency of which is such that coupling of flexural vibrations from the transducer to the tool body in a predetermined frequency range is inhibited.

3. A logging tool as claimed in claim 2, wherein the resonant frequency of the spring mountings is less than the lower limit of the predetermined frequency range.

4. A logging tool as claimed in claim 2, wherein the spring mountings are relatively flexible in the direction of oscillation of the transducer and relatively stiff in a direction orthogonal thereto.

5. A logging tool as claimed in claim 1, wherein the resonant frequency of the shell falls outside a predetermined frequency range.

6. A logging tool as claimed in claim 1, wherein the weight of the shell is less than the weight of the reaction mass.

7. A logging tool as claimed in claim 1, wherein the transducer is located in a cavity in the tool body, structural members extending between parts of the tool body on either side of the cavity around the periphery of the cavity.

8. A logging tool as claimed in claim 7, wherein the resonant frequency of the structural members falls outside the frequency range of interest.

9. A logging tool as claimed in claim 1, wherein a structural load bearing member runs along the length of the tool inside the tool body and the transducer is mounted on the load bearing member.

10. A logging tool as claimed in claim 1, wherein the shell is shorter than the shortest wavelength of acoustic waves in the formation surrounding the borehole to be measured.

11. A logging tool as claimed in claim 1, wherein the transmitter includes a plurality of transducers.

12. A logging tool as claimed in claim 11, wherein, in use, the transducers oscillate in orthogonal directions.

13. A transmitter for a well logging tool, comprising:
a transducer housing;
a transducer mounted in the transducer housing, the transducer comprising a shell having a reaction mass and a motor located therein, the motor operatively connecting the shell and the reaction mass, and only an outer surface of the shell being in contact with the fluid in the borehole.

14. A transmitter as claimed in claim 13, wherein the transducer housing has two transducers mounted therein.

15. A transmitter as claimed in claim 14, wherein the transducers oscillate in orthogonal directions.

16. A transmitter as claimed in claim 13, wherein the transducer is located in a cavity in the housing, structural members extending between parts of the housing on either side of the cavity around the periphery of the cavity.

17. A transmitter as claimed in claim 13, a structural load bearing member runs along the length of the housing and the transducer is mounted on the load bearing member.

18. A transmitter as claimed in claim 13, comprising multiple transducers configured as a phased array.

19. A transmitter as claimed in claim 13, wherein the transducer contains motors acting in orthogonal directions on the shell.

* * * * *